(12) United States Patent
Majerus et al.

(10) Patent No.: US 11,630,579 B2
(45) Date of Patent: Apr. 18, 2023

(54) MEMORY SUB-SYSTEM PERFORMANCE SHAPING INCLUDING ADDING A DELAY TO PARTICULAR DATA TRAFFIC

(71) Applicant: Micron Technology, Inc., Boise, ID (US)

(72) Inventors: Douglas E. Majerus, Boise, ID (US); Steven J. Hanna, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 8 days.

(21) Appl. No.: 17/014,419

(22) Filed: Sep. 8, 2020

(65) Prior Publication Data
US 2021/0255768 A1 Aug. 19, 2021

Related U.S. Application Data

(60) Provisional application No. 62/976,480, filed on Feb. 14, 2020.

(51) Int. Cl.
*G06F 3/06* (2006.01)
(52) U.S. Cl.
CPC ............ *G06F 3/061* (2013.01); *G06F 3/0634* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| 8,468,292 | B2 | 6/2013 | Aszmann et al. |
| 9,508,397 | B1 | 11/2016 | Egushi et al. |
| 10,708,129 | B1* | 7/2020 | Levin ................. H04L 41/0816 |
| 2012/0226962 | A1 | 9/2012 | Franceschini et al. |
| 2013/0054918 | A1* | 2/2013 | Banzhaf .............. G06F 11/1076 |
| | | | 711/163 |
| 2013/0145075 | A1* | 6/2013 | Huang .................. G06F 11/008 |
| | | | 711/E12.078 |
| 2014/0082460 | A1 | 3/2014 | Pangal et al. |
| 2014/0244892 | A1* | 8/2014 | Goss ..................... G06F 3/0653 |
| | | | 711/102 |
| 2016/0299697 | A1* | 10/2016 | Chen ..................... G06F 3/0611 |

\* cited by examiner

*Primary Examiner* — Jane W Benner
(74) *Attorney, Agent, or Firm* — Brooks, Cameron & Huebsch, PLLC (57) ABSTRACT

A method includes determining, by component of a memory sub-system, workload characteristics corresponding to a workload to be received by the memory sub-system. The method can further include dynamically altering a performance attribute of the memory sub-system based, at least in part, based on the determined workload characteristics.

19 Claims, 5 Drawing Sheets

MEMORY SUB-SYSTEM PERFORMANCE SHAPING INCLUDING ADDING A DELAY TO PARTICULAR DATA TRAFFIC

PRIORITY INFORMATION

This application claims priority to U.S. Provisional application Ser. No. 62/976,480, filed on Feb. 14, 2020, the contents of which are incorporated herein by reference.

TECHNICAL FIELD

Embodiments of the disclosure relate generally to memory sub-systems, and more specifically, relate to memory sub-system performance shaping.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system performance shaping, in particular to memory sub-systems that include a performance shaping component. A memory sub-system can be a storage system, storage device, a memory module, or a combination of such. An example of a memory sub-system is a storage system is a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

An SSD is a type of memory sub-system that uses integrated circuit assemblies to store data persistently, typically using flash memory. An SSD can include memory devices that include one or more arrays of memory cells. The performance and/or endurance of an SSD can be related to the type(s) of memory cells employed by the SSD. In general, as the quantity of bits stored per cell increases, the endurance of the SSD (e.g., the amount of program-erase (PE) cycles, which can correspond to the quantity of reads or writes that can be performed on any given cell before the cells become unreliable) tends to decrease. For example, memory blocks of an SSD that contain SLCs can exhibit a greater endurance than memory blocks of an SSD that contain MLCs. Table 1 illustrates an example of rated PE cycles for a memory device that includes TLC media and QLC media. As shown in Table 1, program-erase (PE) cycles can be adversely affected as the number of stored bits per cell increases.

TABLE 1

| Storage Technology | Rated NAND PE Cycles | Drive Terabytes Written (Low end: 100% 4 KB random writes. High end: 100% 128 KB sequential writes) | Drive Writes Per Day (DWPD) (Low end: 100% 4 KB random writes. High end: 100% 128 KB sequential writes) |
|---|---|---|---|
| TLC SSD (7.68 TB) | 10,000 | 8,400-100,000+ | 0.60-1.00 |
| QLC SSD (7.68 TB) | 1,500 | 700-11,210 | 0.05-0.80 |

As shown in Table 1, the endurance of a memory sub-system (e.g., SSD) varies significantly based on the type of writes the memory sub-system receives and based on the underlying media technology (e.g., NAND) in the memory sub-system. For QLC memory sub-systems that have lower endurance, random write-heavy workloads can quickly exhaust a memory sub-system's rated life. An example of a common random write-heavy workload is online transactional processing (OLTP), which is used in nearly every industry and in most companies. Because OLTP can correspond to scenarios in which sequential data is rarely ingested by the memory device (e.g., scenarios in which the memory device typically ingests non-sequential random writes), it can difficult to protect against such a scenario.

Aspects of the present disclosure address the above and other deficiencies by having a memory sub-system that address such worst-case random write scenarios by tuning behavior of the memory device(s) of the memory sub-system to make the execution of inappropriate workloads less attractive for the end user, while also enabling the memory sub-system to last longer than it normally would be able to. Embodiments herein can selectively alter a write speed of a memory sub-system based on a type of workload ingested by the memory sub-system. For example, based on a size of data transfers ingested by the memory sub-system and the nature of these transfers (e.g., a host transfer size and whether it is a random or sequential transfer), a variable delay can be inserted after a write queue command is processed. This can allow for memory sub-system throughput for low transfer size to be curtailed below capability to reduce write speeds (e.g., 4K write speeds). In addition, in some embodiments, sequential throughput can also be reduced to provide an extra measure of protection and differentiate QLC memory sub-systems from TLC memory sub-systems. In some embodiments, the reduced host write performance can free up backend bandwidth to service read commands and improve mixed workload performance. Embodiments are not limited to OLTP implementations, however, and the write speed associated with other types of workloads can be selectively altered.

Aspects of the present disclosure describe a memory sub-system that can allow for workload type and/or exposure of the memory sub-system to different types of workloads to be identified in terms of write throughput of the memory sub-system. Because a memory sub-system can exhibit higher vulnerability for smaller write sizes, which can be indicative of random workloads than for larger write sizes, which can be indicative of sequential workloads, memory sub-system performance for smaller data transfer sizes can be altered (e.g., shaped) to reduce write speeds for smaller data transfers than for larger data transfers. In turn, this can make the memory sub-system less attractive for a user that generally operates with smaller random workloads than larger sequential workloads. As used herein, a "user" can refer to a human user (e.g., a person) or machine (e.g., a sub-system, process, host system, etc.) that provides instructions to the memory sub-system to cause the memory sub-system to perform a task or action. This can, in turn, dissuade a user from using a particular memory sub-system for workloads that can cause the memory sub-system to wear out prematurely thereby improving the lifespan of the memory sub-system. Stated alternatively, embodiments herein can shape performance of a memory sub-system based on the size of data transfers ingested by the memory sub-system to encourage a user to select workloads that have larger transfer sizes, thereby increasing the lifespan of the memory sub-system.

As described above, the endurance of a memory sub-system can be affected by workloads that the memory sub-system is subjected to. However, the endurance of a memory sub-system can be based on the architecture of the memory sub-system. For example, some memory sub-systems can exhibit higher endurance when subjected to sequential workloads than when subjected to random workloads, while other memory sub-systems can exhibit higher endurance when subjected to random workloads than when subjected to sequential workloads. Some memory sub-systems that exhibit higher endurance when subjected to sequential workloads can support a greater number of fills per day when ingesting sequential workloads when ingesting random workloads. As a non-limiting example, an 8 terabyte (TB) QLC memory sub-system can support up to 0.8 fills per day when handling sequential workloads but can only support 0.05 fills per day when the workloads are presented as 4 kilobyte (KB) random writing of data received from a host computing device. Accordingly, for some memory sub-systems it can be beneficial to encourage users to supply sequential workloads to the memory sub-system to improve the endurance of the memory sub-system.

Because of the endurance concerns associated with some approaches to SSDs, many users continue to use 10,000 RPM hard disk drives (10K HDDs) in performance-sensitive applications, since 10K HDDs are the fastest broadly-available hard drives. However, provided that the endurance is sufficient for an application, most users prefer to use a memory sub-system to take advantage of the performance increase in comparison with a 10K HDD.

In order to provide high SSD performance while being mindful of endurance constraints, some conventional approaches utilize the concept of endurance throttling, in which the raw speed at which data is written to the SSD is reduced in order to prolong the life of the SSD, regardless of the user's workload or use case. For example, some conventional approaches intentionally delay the speed at which data is written to the SSD to prolong the life of the SSD. Such throttling has historically been implemented progressively as the SSD becomes older and/or has experienced more and more writes or program-erase cycles (i.e. the drive's performance degrades linearly and/or variably as its PE cycle count gets consumed and performance throttling typically has had no relation to the user's actual workload). By progressively throttling the SSD, the overall performance of the SSD decreases in an unpredictable fashion, which violates customer requirements of predictability and consistency, which is why historical throttling approaches have not succeeded with end customers.

Aspects of the present disclosure address the above and other deficiencies by allowing for consistent memory sub-system performance shaping that is based on types of workloads being applied to a memory sub-system, such as an SSD. For example, embodiments herein can allow for a memory sub-system to exhibit consistent performance throughout the life of the memory sub-system. In some embodiments, performance of the memory sub-system can be set at initiation of the memory sub-system (e.g., when time "T"=0 relative to the life of the memory sub-system) and can remain constant (or nearly constant) through the life of the memory sub-system. This can allow for the life and/or performance of the memory sub-system to be improved in comparison to approaches that do not employ the methodologies and/or techniques described here. In addition, embodiments herein can allow for an end user to appreciate how execution of various workloads can impact the performance of the memory sub-system and/or influence the user's decision of what type of memory sub-system to use for various applications.

In order to achieve constant performance through the life of a memory sub-system, some embodiments described herein can selectively throttle particular workloads based, at least in part, on characteristics of workloads assigned to the memory sub-system. The characteristics of workloads assigned to the memory sub-system can, in some embodiments, be based on behavior (e.g., commands, workload allocation, executed applications, data types, etc.) of a host computing device coupled to the memory sub-system. For example, incoming traffic from a host computing device to the memory sub-system can be analyzed by circuitry of the memory sub-system to determine whether to selectively throttle particular traffic received from the host.

Non-limiting examples of workload characteristics that can be indicative of particular host computing system behavior can include internal architectural boundaries of a memory sub-system coupled to the host computing system that can dictate the overall endurance characteristics of the memory sub-system, high vs. low transfer sizes, hot vs. cold data, and/or transfer sizes less than determinable translation unit (TU) sizes, among others. A TU refers to the smallest size of data internally managed by a memory sub-system controller, local media controller, or a host system. As used herein, "hot data" generally refers to data that is stored in a memory location that is rewritten (e.g., "turned over") at a rapid rate. Whether data is "hot" or not can be determined based on comparison of a logical block address (LBA) associated with incoming data traffic LBA as compared to a block version number, which can indicate how far in the past the data was written. Conversely, "cold data" refers to data that is not rewritten or turned over at a rapid rate. Similar to how hot data is determined, whether data is "cold" or not can be determined based on comparison of an LBA associated with incoming data traffic LBA as compared to a block version number, which can indicate how far in the past the data was written. Further, TU sizes can be generally translated to architectural granularity limits that cause extensive write amplification when data is written smaller than this size. For example, consider a table that can understand data in 4k chunks. These chunks can be written contiguously. If the host writes 1K values, the full 4K value is read, the new 1K chunk inserted, and the new 4K chunk written back to media. In this example, a host change of 1K worth of data actually caused 4k worth of writes to the media, creating a write amplification of 4.

In various embodiments, memory sub-system performance shaping can be achieved by setting, by the memory sub-system and/or components of the memory sub-system, performance restrictions. In a non-limiting example, setting performance restrictions in accordance with the disclosure can include determining the endurance profile of the memory sub-system or media (e.g., TLC media, QLC media, etc.), noting for any workloads that could create discontinuities or premature or accelerated wear-out of the media. In addition, data traffic characteristics that could be characteristic of these types of workloads could be known at time of manufacture of the memory sub-system.

An example of how performance restrictions can be set in accordance with the present disclosure can include creating a market analysis and/or segmentation of applications where the memory sub-system is going to be used. Application requirements corresponding to workloads that will likely be ingested by the memory sub-system can be determined for each application that can invoke the memory sub-system. Such application requirements or parameters can include read/write rations, typical ingestion percentages (e.g., an amount of time dedicated to loading new data to the memory sub-system), a percentage of time that the memory sub-system is active vs. inactive, and/or warranty lifetime of the memory sub-system, among others. Continuing with this example, it can be determined that particular traffic types can be addressed to make sure that the memory sub-system will not be misused (e.g., to ensure that execution of workloads that are indicative of the memory sub-system experiencing premature wear out are minimized).

In some embodiments, target performance levels that could dissuade a user from using the memory sub-system for a particular application can be determined. The performance targets can be implemented in the media based on incoming traffic or other information available to the memory sub-system. In some embodiments, the media can add additional delays to traffic that can yield poor endurance, making the memory sub-system less attractive to use in workloads that would compromise the useful life of the storage sub-system. Further, performance by applications can be made visible to the end user. For example, immediate performance (e.g., performance at T=0 of the memory sub-system) of the memory sub-system, data sheet specifications, marketing materials, and/or among others. This can allow for the end user to do a performance appraisal and/or find the performance can be lacking in demanding and/or unsuitable workloads. This can lead to the end user self-selecting workloads where the memory sub-system is a good match so as to not prematurely wear out the memory sub-system. For example, embodiments described herein can allow for operations of a memory sub-system that can lead to the end user self-selecting applications where performance and, by proxy, endurance are a good fit for the memory sub-system.

In some embodiments, memory sub-system performance can be improved in comparison to some approaches by limiting writes by creating a minimum wait time from when a host write command is processed until the next host write command is executed. The delay can be dynamic, reacting to incoming transfer size. This can result in the ability to set independent throttling thresholds for sequential (e.g., 128K data transfer sizes) throughput and random write (e.g., 4K data transfer sizes) throughput by using the LBA transfer size, which can provide a good available proxy for representing how random (low transfer size) or sequential (high transfer size) the workload is. Embodiments are not so limited, however, and in some embodiments, the memory sub-system can be configured to communicate exact conditions that can result in differing endurance characteristics of the memory sub-system based on performance consequences associated with the memory sub-system under different workloads. For example, embodiments herein can allow for the memory sub-system to communicate performance characteristics (e.g., performance metrics) associated with execution of various workloads. These metrics can be mathematically scaled based on transfer size to give a contiguous performance profile for any transfer size.

In some embodiments, a "first fill" feature can also be added where throttling is curtailed for the first media fill. This can allow for full speed loading of data onto the memory sub-system at least initially so that the memory sub-system can be loaded with data quickly on its first use. This can allow for the initial data ingestion to support maximum throughput, but subsequent operations to reflect the rated or throttled data transfer rate. In some embodiments, the "first fill" feature can be provided by allowing a user to temporarily disable performance shaping of the memory sub-system for a certain quantity of data written to the memory sub-system after initiation of the memory sub-system, a predetermined time period after initiation of the memory sub-system, and/or a predetermined quantity of PE cycles after initiation of the memory sub-system. This can improve performance (e.g., write speed) during the initial setup of the memory sub-system, which can be a write intensive process.

In some embodiments, a "good user" feature can also be added where the memory sub-system starts at the datasheet max restrictions but can increase throughput as onboard metrics indicate that the memory sub-system can exceed its expected lifespan based on how the user is using it and the parameters of their workload. These metrics can include total bytes written as a percentage of memory sub-system power on hours, memory sub-system life gauge as a percentage of power on hours, or other metrics that are indicative of the memory sub-system trending toward exceeding its lifespan and endurance goals. As the time that the metric indicates that the memory sub-system is set to exceed rated life, the performance restrictions and/or delays can be reduced or eliminated entirely to provide the end user better performance than the datasheet's established expectation. Because datacenter customers typically must optimize their infrastructure for minimum service level performance agreements, this feature rewards customers for knowing their workload and allows them to get what they expect out of a sub-system—and hopefully even more.

For media that has limited capability, embodiments herein can provide a way to signal what workloads would be compatible with the memory sub-system and what workloads are not. This can allow for general purpose servers to be deployed with media that may wear out under some conditions. Embodiments herein can create an incentive for end users to self-select and avoid uses that will wear out the media, such as writing too much information or turning over the media too quickly. These applications can be specifically set to make the memory sub-system have poor performance under these conditions and cause the user to select a more appropriate media or memory sub-system for certain applications or workloads. Additionally, embodiments herein can specifically tune memory sub-system performance to levels that might encourage users to use the right type of memory sub-system for their application, while also exceeding incumbent hard drive performance levels in every area, enabling the use of QLC memory sub-systems in general purpose servers, which was previously thought to be impossible.

Additional non-limiting examples of memory sub-system performance shaping in accordance with the disclosure can include "First Fill" and "Good User" implementations, which are described in more detail, herein, as well as expanded parameters that can be used in determining if, when, and to what extent the memory sub-system is to be throttled. Non-limiting examples of such parameters can include queue depth, sequential vs. random writes (e.g., by determining if the queue is contiguous), aligned vs. unaligned transfers (e.g., transfers that are aligned to a TU boundary vs. transfers that not aligned to a TU boundary), hot vs. cold data (e.g., data that frequently accessed vs. data that is less frequently accessed), data transfer sizes (e.g., if a transfer size is less than or greater than the TU size), target name spaces (zoned namespaces, etc.), media types (for example, the memory sub-system can have areas for SLC or TLC writes that could be throttled independently), ONFI (NAND bus) slowdowns, clock rate changes, and/or NAND parameter tuning (e.g., increasing the typical page programming time (Tprog) for the memory sub-system to slow down write speed), among others.

Figure 1:
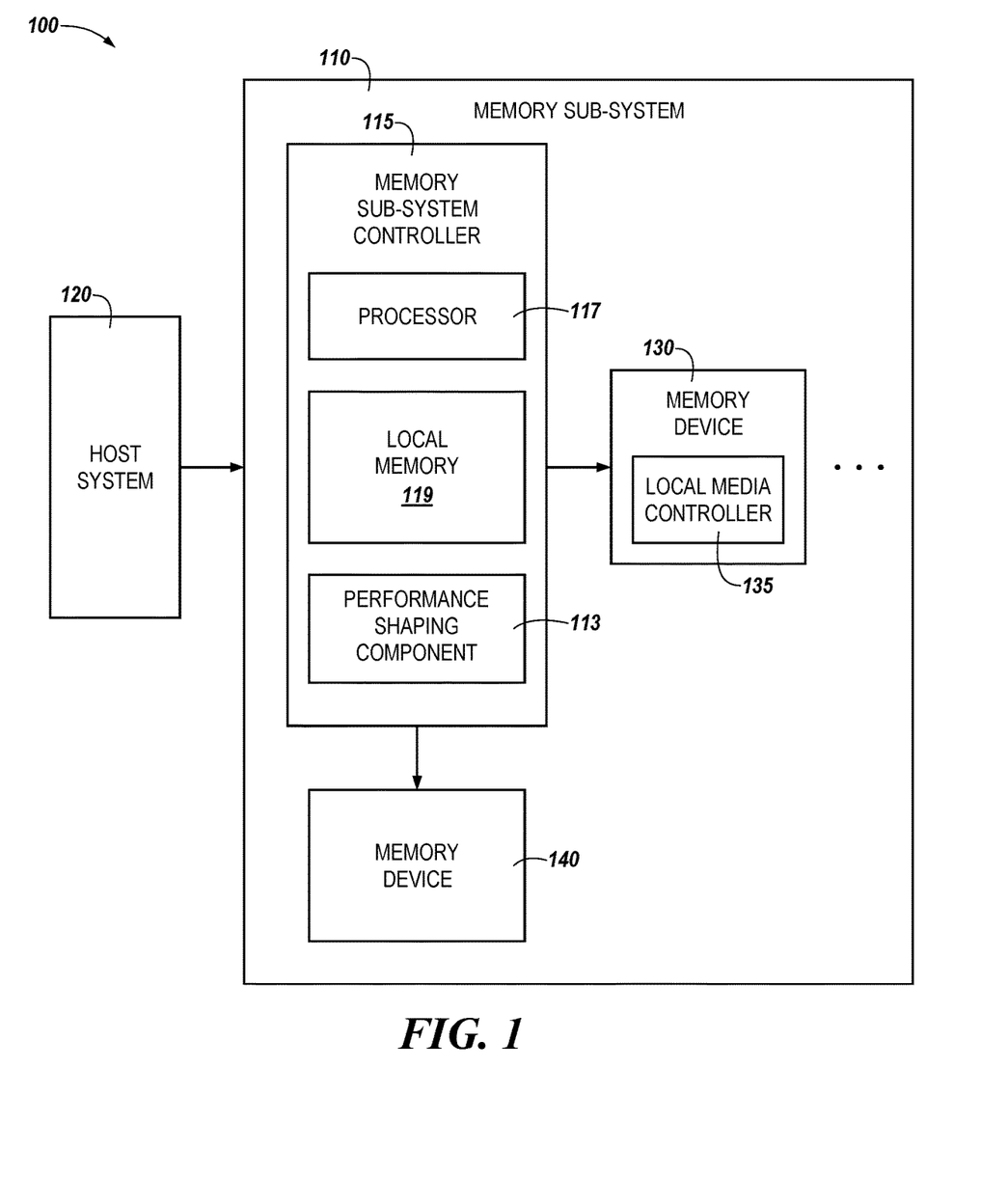
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI)), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a performance shaping component 113. Although not shown in FIG. 1 so as to not obfuscate the drawings, the performance shaping component 113 can include various circuitry to facilitate selective throttling or delaying of data written to the memory device 130 and/or the memory device 140 based on workload characteristics, as described herein. In some embodiments, the performance shaping component 113 can facilitate performance shaping for the memory device 130 and/or the memory device 140 by changing communication to the memory device (e.g., selectively changing speeds at which data is transferred over various interfaces associated with the memory device 130 and/or the memory device 140) and/or modifying the actual performance of the memory device (e.g., by selectively altering NAND component write performance). In some embodiments, the performance shaping component 113 can include a special purpose circuitry in the form of an ASIC, FPGA, state machine, and/or other logic circuitry that can allow the performance shaping component 113 to orchestrate and/or perform operations to selectively throttle or delay data written to the memory device 130 and/or the memory device 140 based on workload characteristics.

Figure 2:
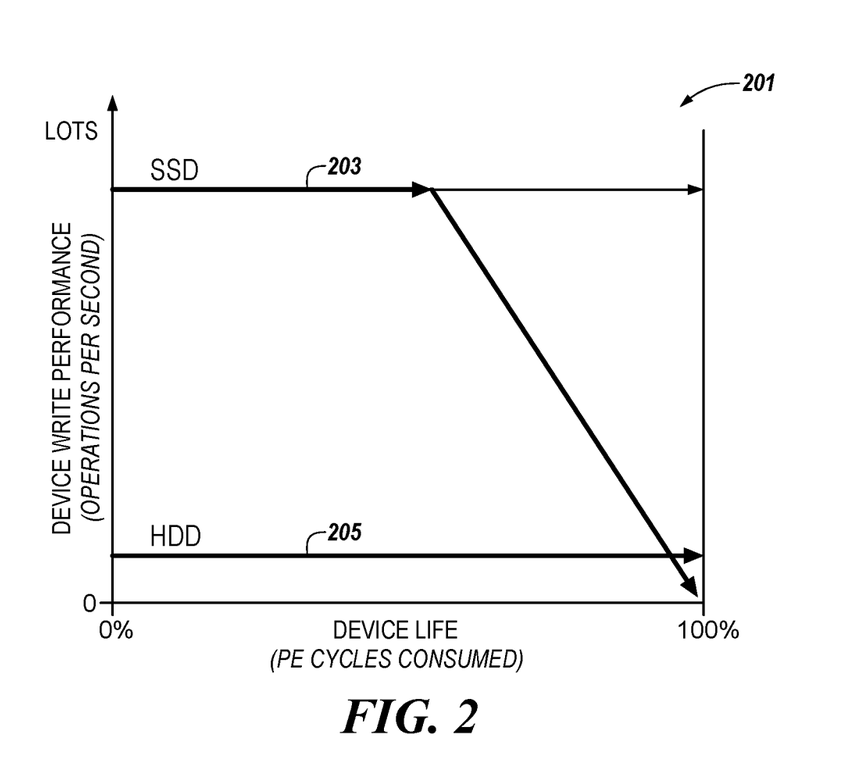
FIG. 2 illustrates an example plot corresponding to performance throttling of a solid-state drive compared to performance of a hard disk drive.

FIG. 2 illustrates an example plot 201 corresponding to historical performance throttling of a solid-state drive compared to the new implementation described herein compared to the performance of a hard disk drive. For example, FIG. 2 illustrates an example plot corresponding to performance throttling of a solid-state drive compared to performance of a hard disk drive according to some approaches. The x-axis corresponds to time and the y-axis corresponds to input/output operations per second. The curve 203 labeled "SSD" corresponds to an example of performance throttling in some approaches. As shown in FIG. 2, in contrast to embodiments described herein, the performance of the SSD is sharply throttled after a particular amount of time has transpired. Although the performance of the SSD can still greater than that of a 10K HDD (illustrated by the curve 205) for at least a portion of the life of the SSD, such approaches in which SSD performance is curtailed toward the later portion of the life of the SSD can make memory devices that behave in this manner undesirable to a user in such approaches.

Figure 3A:
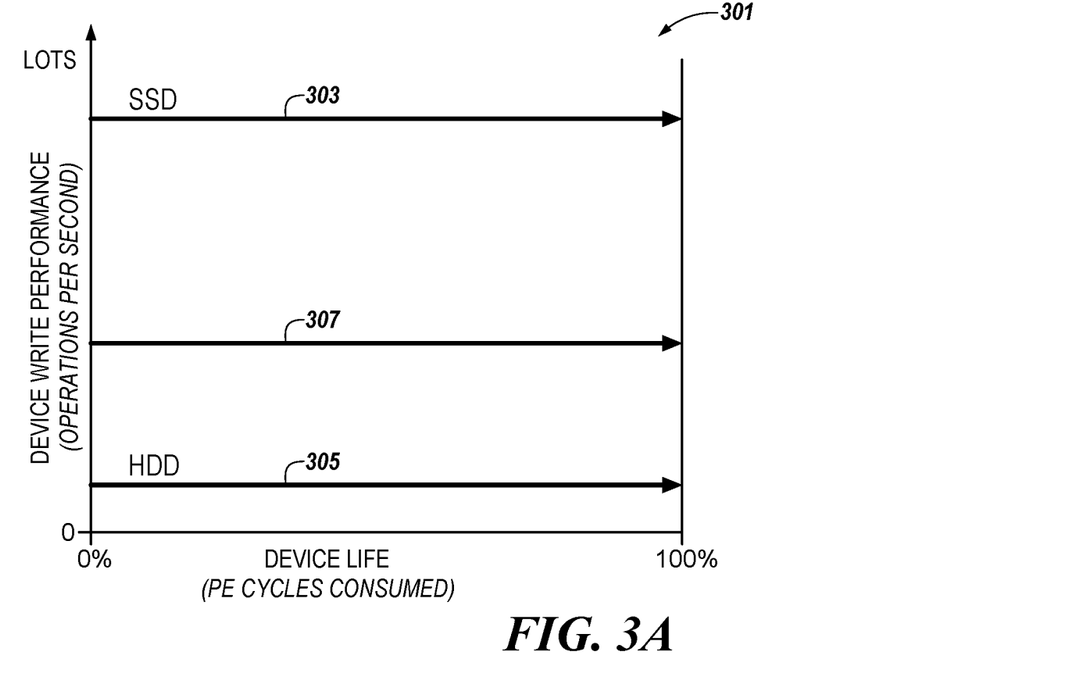
FIG. 3A illustrates an example plot corresponding to memory device performance compared to memory device life.

FIG. 3A illustrates an example plot 301 corresponding to memory device performance compared to memory device life. The curve 303 in the example shown of FIG. 3A shows an example of memory device performance when write performance is unthrottled. The curve 307 in the example shown of FIG. 3A shows an example of memory device performance when write performance is dynamically throttled, and the curve 305 in the example shown of FIG. 3A shows an example of HDD performance. As a result, FIG. 3A illustrates an example in which different types of incoming data streams are changed based on their parameters and device performance dynamically changes based on the type of incoming data and how it impacts device endurance and longevity.

Memory sub-system performance can be based on type of media and data transfer size. For example, for sequential writes, performance levels of a memory sub-system can be altered based, at least in part, on a transfer size (e.g., an amount) of data written to the memory sub-system and the degree of danger the write present to the lifetime of the memory sub-system. In other examples, for random writes, performance levels of a memory sub-system can be altered based, at least in part, on a transfer size (e.g., an amount) of data written to the memory sub-system and the degree of danger the write present to the lifetime of the memory sub-system.

Figure 3B:
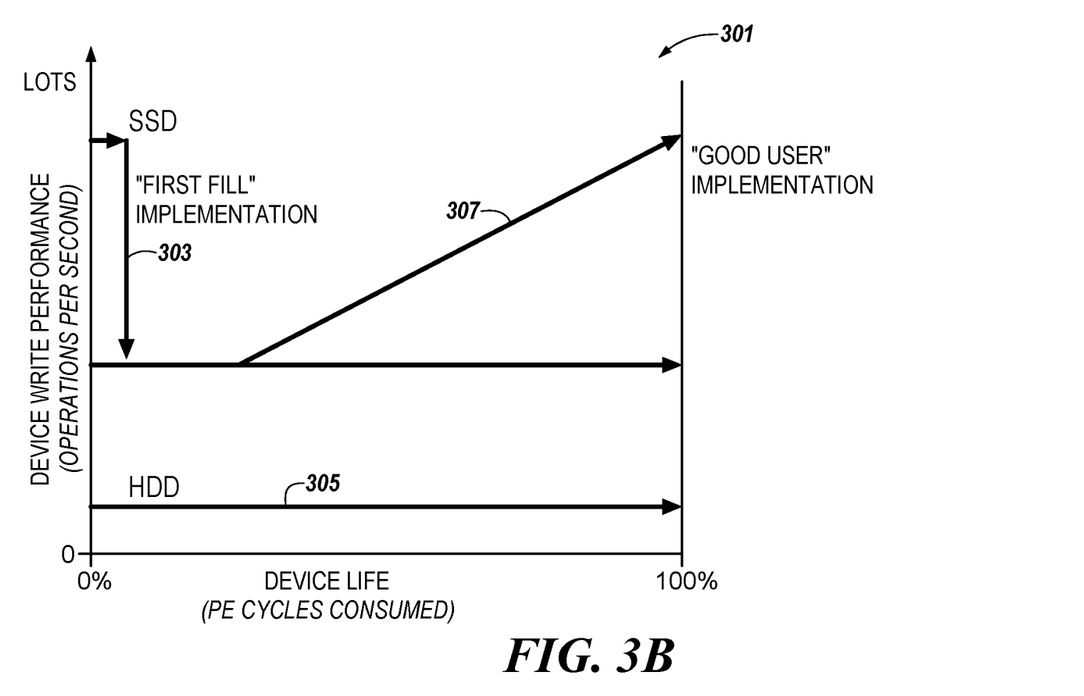
FIG. 3B illustrates another example plot corresponding to memory device performance compared to memory device life.

FIG. 3B illustrates another example plot 301 corresponding to memory device performance compared to memory device life. The curve 303 in the example shown of FIG. 3B shows an example of a "first fill" implementation as described herein while the curve 307 in the example shown of FIG. 3B shows an example of a "good user" implementation as described herein. The curve 305 shows, for comparison, an example of HDD performance. In the example of FIG. 3B, performance shaping as described herein can include a "first fill" and/or "good user" implementation in which performance shaping algorithms can be applied across various types of data streams.

As shown by the curve 303 in FIG. 3B, for a period of time or quantity of PE cycles, the memory device performance can be unthrottled to allow for data to be written quickly to the memory device. This can allow a user of the memory device to transfer data to the device early in the life of the device to ensure that the memory device can be used fairly soon after purchase. In some embodiments, once the period of time or quantity of PE cycles has elapsed, the memory device performance can be throttled as described herein.

As shown by the curve 307 in FIG. 3B, in some embodiments, the performance of the memory device can be dynamically increased over time based on the use history of the memory device. For example, if it is determined that the memory device is on track to exceed a warranted lifespan, the performance throttling can be relaxed thereby increasing performance of the memory device over time.

In some embodiments, memory sub-system performance can be based on type of media and data transfer size. For example, for sequential writes, performance levels of a memory sub-system can be altered based, at least in part, on a transfer size (e.g., an amount) of data written to the memory sub-system and the degree of danger the write present to the lifetime of the memory sub-system. In other examples, for random writes, performance levels of a memory sub-system can be altered based, at least in part, on a transfer size (e.g., an amount) of data written to the memory sub-system and the degree of danger the write present to the lifetime of the memory sub-system.

In some embodiments, based on how the memory sub-system is used, specific workload characteristics can be targeted to dissuade use in cases where the memory sub-system (or media) may be misused while modifying or not throttling other workloads. As an example, sequential write performance may not be throttled where the random write performance was identified to have significant reliability risk and is therefore throttled to lower performance.

Figure 4:
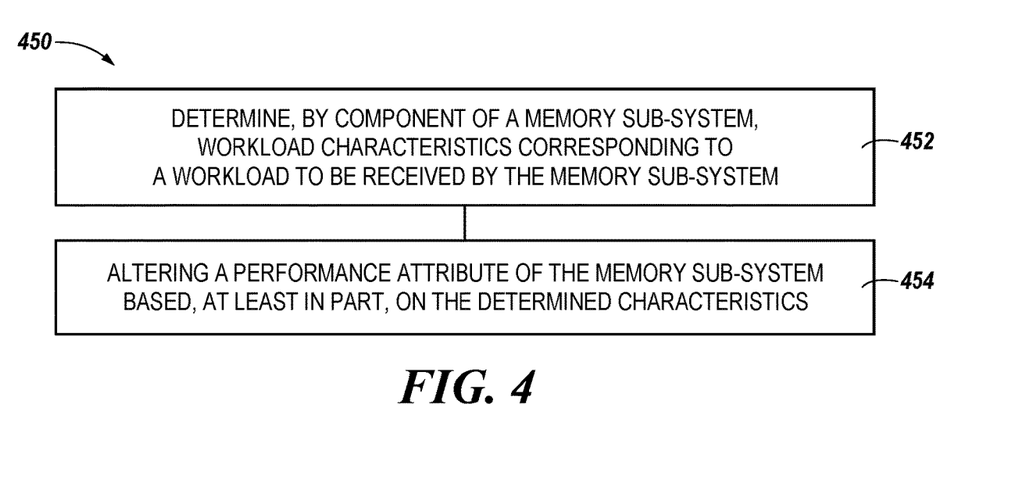
FIG. 4 is a flow diagram corresponding to a method for memory device performance shaping in accordance with some embodiments of the present disclosure.

FIG. 4 is a flow diagram corresponding to a method for memory device performance shaping in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the performance shaping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 452, the method 450 can include determining, by component of a memory sub-system, workload characteristics corresponding to a workload to be received by the memory sub-system. The memory sub-system can be analogous to the memory sub-system 110 illustrated in FIG. 1, herein. In some embodiments, the workload characteristics can include information indicative of whether data corresponding to the workload is aligned or unaligned, a quantity of bits associated with data included in the workload, an amount of time that the data is to be stored, or will be stored by the memory sub-system, and/or whether the data corresponding to the workload comprises a quantity of bits that is greater than or less than a translation unit (TU) size corresponding to a host computing device couplable to the memory sub-system, or any combination thereof.

At block 454, the method 450 can include altering a performance attribute of the memory sub-system based, at least in part, on the determined workload characteristics. The performance attribute of the memory sub-system can include a speed at which an operation invoking the memory sub-system is executed and/or a delay prior to which an operation invoking the memory sub-system is executed. The performance attribute of the memory sub-system can only be altered within a predetermined range and/or the performance attribute of the memory sub-system may not change based on an amount of use of the memory sub-system.

In some embodiments, the method 450 can include receiving, by the memory sub-system and responsive to initiation of an operation, the workload characteristics and/or altering the performance attribute of the memory sub-system such that for a particular sub-set of workload characteristics, a write speed of the memory sub-system is decreased. Embodiments are not so limited, however, and in some embodiments, the method 450 can include receiving, by the memory sub-system and responsive to initiation of an operation, the workload characteristics and/or altering the performance attribute of the memory sub-system such that for a particular sub-set of workload characteristics, a write speed of the memory sub-system is increased.

In some embodiments, the method 450 can include altering the performance attribute of the memory sub-system based, at least in part, by selectively throttling performance of the memory sub-system based on specific types of workloads to be received by the memory sub-system. The specific types of workloads can be determined based on whether the workload includes sequential writes or random writes (e.g., whether consecutive transfers address contiguous host address spaces (sequential), or whether the access pattern addresses different locations with each command (random), a data transfer size for protocols that do not have a fixed transfer size, quantity of bits associated with the workload, a frequency of execution of the workload, which can correspond to an age of the data stored in a particular location in the memory device (e.g., because a memory device can associate a version number to a location to which data is written in the memory device, a determination of how far in the past the data was written to the memory device can be made and/or can be used to determine whether to selectively throttle subsequent data transfers to the same location in the memory device), and/or endurance conditions set for the memory sub-system. In some embodiments, a maximum performance throttling of the memory sub-system is fixed at manufacture of the memory sub-system (e.g., at T=0 for the life of the memory sub-system).

Figure 5:
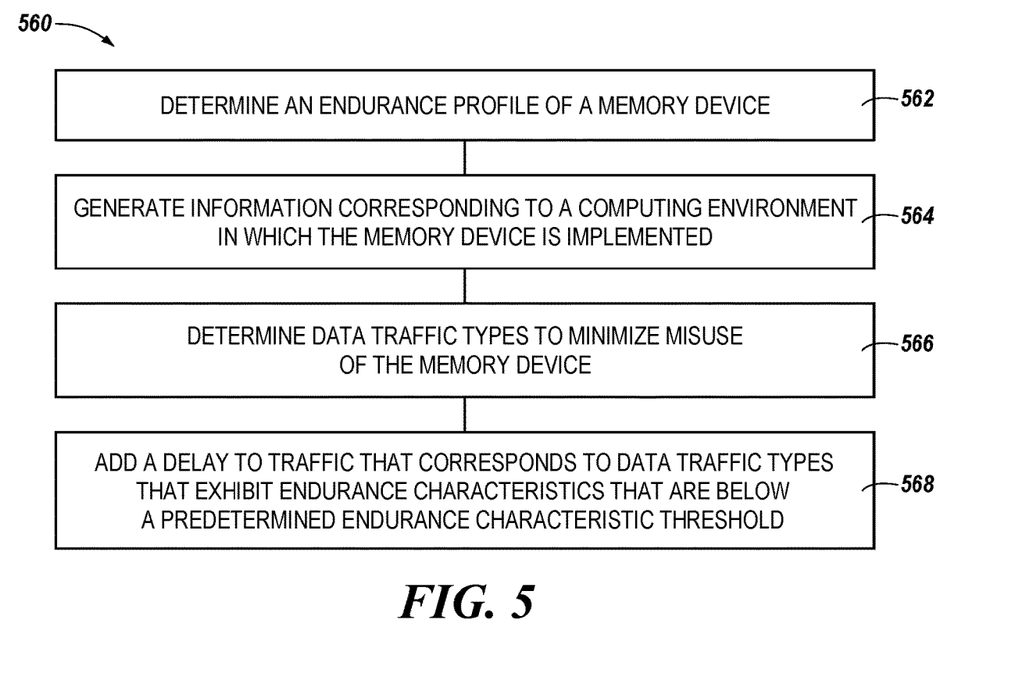
FIG. 5 is another flow diagram corresponding to a method for memory device performance shaping in accordance with some embodiments of the present disclosure.

FIG. 5 is another flow diagram corresponding to a method for memory device performance shaping in accordance with some embodiments of the present disclosure. The method 560 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 560 is performed by the performance shaping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 562, the method 560 can include determining an endurance profile of a memory device. The memory device can be analogous to the memory device 130 and/or the memory device 140 illustrated in FIG. 1, herein.

At block 564, the method 560 can include generating information (e.g., a market analysis, segmentation of applications, or both) corresponding to a computing environment in which the memory device is implemented. Market and workload analysis, which can include surveys or other data collection tools, can be used to determine appropriate throttling levels that correspond to various applications and/or workloads executed by a memory device. Such analysis can be used to determine areas where a reduction in performance of a memory device could impact and/or prolong the life of the memory device while minimizing adverse impacts to other workloads ingested by the memory device can be identified through market analysis. These data can be applied by the memory device in the form of selective throttling of data ingested by the memory device based on incoming data traffic patterns the memory device is subjected to. In some embodiments, the method 560 can include providing information corresponding to the market analysis, the segmentation of applications, or both corresponding to the computing environment in which the memory device is implemented to an end user.

At block 566, the method 560 can include determining data traffic types to minimize misuse of the memory device. In some embodiments, the method 560 can include determining historical use characteristics of the memory device and/or reducing the delay to the traffic based on the use characteristics of the memory device exceeding a predetermined use pattern threshold.

At block 568, the method 560 can include adding a delay to traffic that corresponds to data traffic types that exhibit endurance characteristics that are below a predetermined endurance characteristic threshold. The method 560 can include adding the delay based, at least in part, on a determined queue depth associated with the memory device, a determination that a queue associated with the memory device is sequential, a determination that a queue associated with the memory device is random, a determination that that traffic is aligned, a determination that the traffic is unaligned, a determination that the memory device contains a threshold quantity of hot data, a determination that the memory device contains a threshold quantity of cold data, a determination that the traffic contains a quantity of data that is less than translation unit size of the memory device, a determined media type (e.g., whether the memory device is configured to write to SLCs, TLCs, QLCs, etc.) and/or a media mode (e.g., whether the memory device is writing data to TLCs, QLCs, etc.) of the memory device. In some embodiments, the delay can be added to the data traffic in accordance with a determination that a clock rate associated with the memory device has been altered, a tuned NAND parameter, determined characteristics of a bus coupled to the memory device, and/or determined target names spaces associated with the memory device, among others.

The method 560 can further include comprising implementing, based on incoming traffic or other information available to the memory device, a desired target performance range for the memory device. In some embodiments, the method 560 can include determining a requirement of an application corresponding to the traffic and/or adding the delay based, at least in part, on the determined requirement. Embodiments are not so limited, however, and in some embodiments, the method 560 can include determining target performance levels that would significantly dissuade an end user from using the memory device for a particular application.

The method 560 can include, in response to determining that traffic that corresponds to data traffic types that exhibit endurance characteristics that are below a predetermined endurance characteristic threshold, performing an operation to cause the memory device to appear to be less attractive for use with the data traffic types that exhibit endurance characteristics that are below a predetermined endurance characteristic threshold. In some embodiments, the method 560 can include flagging workloads that create discontinuities, premature wear out of the memory device, or accelerated wear out of the memory device, or any combination thereof.

In some embodiments, the method 560 can include adding the delay based, at least in part, on a determination that a data contained within a queue associated with the memory device corresponds to a substantially sequential workload and/or adding the delay based, at least in part, on a determination that data contained within a queue associated with the memory device corresponds to a substantially random workload. As used herein, the term "substantially" intends that the characteristic needs not be absolute, but is close enough so as to achieve the advantages of the characteristic. For example, a "substantially sequential workload" is not limited to a workload that is entirely sequential and can include workloads that are largely sequential even if they are not completely sequential.

Figure 6:
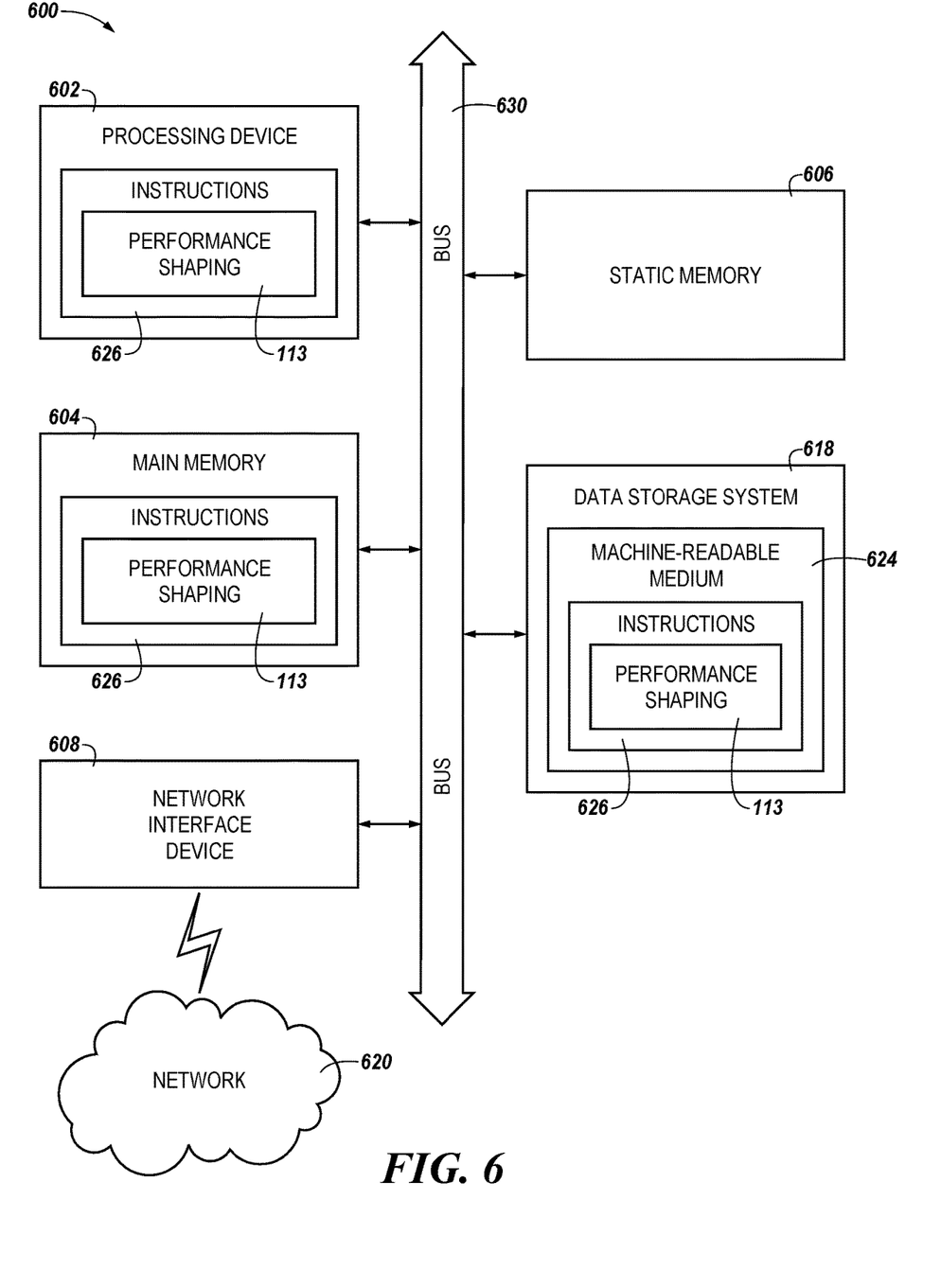
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the performance shaping component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a performance shaping component (e.g., the performance shaping component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining, by a controller of a memory sub-system, workload characteristics corresponding to a workload executed by the memory sub-system, wherein the workload characteristics comprise information indicative of:
      whether data corresponding to the workload is aligned or unaligned;
      a length of a data transfer having a variable transfer length protocol;
      an amount of time that the data is to be stored, or will be stored by the memory sub-system; and
      whether the data corresponding to the workload comprises a quantity of bits that is greater than or less than a translation unit (TU) size corresponding to a host computing device couplable to the memory sub-system; and
   altering a performance attribute of the memory sub-system based, at least in part, on the determined workload characteristics by adding a delay to data traffic associated with workloads that exhibit at least one of the workload characteristics.

2. The method of claim 1, comprising:
   receiving, by the memory sub-system and responsive to initiation of an operation, the workload characteristics; and
   altering the performance attribute of the memory sub-system to, for a particular sub-set of workload characteristics, dynamically decrease or increase a write speed of the memory sub-system based on the parameters of the incoming write and a history of write activity for a user of the memory sub-system over a deployment lifetime of the memory sub-system.

3. The method of claim 1, comprising:
   receiving, by the memory sub-system and responsive to initiation of an operation, the workload characteristics; and
   altering the performance attribute of the memory sub-system such that for a particular sub-set of workload characteristics, a write speed of the memory sub-system is increased.

4. The method of claim 1, further comprising adding the delay to the data traffic when wherein the workload characteristics comprise information indicative of:
   whether the data corresponding to the workload is aligned or unaligned;
   a length of a data transfer has greater than a threshold having a variable transfer length protocol;

an amount of time that the data is to be stored, or will be stored by the memory sub-system is greater than threshold period of time; or whether the data corresponding to the workload comprises a quantity of bits that is greater than the TU size corresponding to the host computing device couplable to the memory sub-system, or any combination thereof.

5. The method of claim 1, wherein the performance attribute of the memory sub-system comprises a speed at which an operation invoking the memory sub-system is executed, a delay prior to which an operation invoking the memory sub-system is executed, or both.

6. The method of claim 1, further comprising altering the performance attribute of the memory sub-system based, at least in part, by selectively throttling performance of the memory sub-system based on specific types of workloads to be received by the memory sub-system.

7. The method of claim 6, wherein the specific types of workloads are determined based on whether the workload includes sequential writes or random writes, a data transfer size associated with the workload, a determined age of data to be overwritten in execution of the workload, or endurance conditions set for the memory sub-system, or any combination thereof.

8. The method of claim 6, wherein a maximum performance throttling of the memory sub-system is fixed at manufacture of the memory sub-system.

9. The method of claim 1, wherein the performance attribute of the memory sub-system can only be altered within a predetermined range or wherein the performance attribute of the memory sub-system does not change based on an amount of use of the memory sub-system, or both.

10. A system, comprising:
a plurality of memory components; and
a controller coupled to the plurality of memory components, wherein the controller is to perform operations comprising:
determining workload characteristics corresponding to a workload executed by a memory sub-system, wherein the workload characteristics comprise information indicative of:
whether data corresponding to the workload is aligned or unaligned;
a length of a data transfer having a variable transfer length protocol;
an amount of time that the data is to be stored, or will be stored by the memory sub-system; and
whether the data corresponding to the workload comprises a quantity of bits that is greater than or less than a translation unit (TU) size corresponding to a host computing device couplable to the memory sub-system; and
altering a performance attribute of the memory sub-system based, at least in part, on the determined workload characteristics by adding a delay to data traffic associated with workloads that exhibit at least one of the workload characteristics.

11. The system of claim 10, wherein the controller is to perform operations comprising:
receiving the workload characteristics; and
altering the performance attribute of the memory sub-system such that for a particular sub-set of workload characteristics, a write speed of the memory sub-system is dynamically decreased or increased based on the parameters of the incoming write and a history of write activity for a user of the memory sub-system over a deployment lifetime of the memory sub-system.

12. The system of claim 10, further comprising adding the delay to the data traffic when:
the data corresponding to the workload is aligned;
a length of a data transfer has less than a threshold transfer length;
an amount of time that the data is to be stored, or will be stored by the memory sub-system is less than a threshold period of time; and
the data corresponding to the workload comprises a quantity of bits that is less than the TU size corresponding to the host computing device.

13. The system of claim 10, wherein the performance attribute of the memory sub-system comprises a speed at which an operation invoking the memory sub-system is executed, a delay prior to which an operation invoking the memory sub-system is executed, or both.

14. The system of claim 10, wherein the controller is to perform operations comprising, in response to determining that traffic that corresponds to data traffic types that exhibit endurance characteristics that are below a predetermined endurance characteristic threshold, performing an operation to cause the memory device to appear to not be selected for use with the data traffic types that exhibit endurance characteristics that are below a predetermined endurance characteristic threshold.

15. An apparatus, comprising:
a memory device; and
a controller coupled to the memory device, wherein the controller is to perform operations comprising:
determining workload characteristics corresponding to a workload executed by a memory sub-system, wherein the workload characteristics comprise information indicative of:
whether data corresponding to the workload is aligned or unaligned;
a length of a data transfer having a variable transfer length protocol;
an amount of time that the data is to be stored, or will be stored by the memory sub-system; and
whether the data corresponding to the workload comprises a quantity of bits that is greater than or less than a translation unit (TU) size corresponding to a host computing device couplable to the memory sub-system; and
altering a performance attribute of the memory sub-system based, at least in part, on the determined workload characteristics by adding a delay to data traffic associated with workloads that exhibit at least one of the workload characteristics.

16. The apparatus of claim 15, wherein the controller is to perform operations comprising:
receiving the workload characteristics; and
altering the performance attribute of the memory sub-system such that for a particular sub-set of workload characteristics, a write speed of the memory sub-system is dynamically decreased or increased based on the parameters of the incoming write and a history of write activity for a user over a deployment lifetime of the memory sub-system.

17. The apparatus of claim 15, further comprising adding the delay to the data traffic when:
the data corresponding to the workload is aligned;
a length of a data transfer has less than a threshold transfer length;
an amount of time that the data is to be stored, or will be stored by the memory sub-system is less than a threshold period of time; and the data corresponding to the workload comprises a quantity of bits that is greater than the TU size corresponding to the host computing device couplable to the memory sub-system.

18. The apparatus of claim 15, wherein the performance attribute of the memory sub-system comprises a speed at which an operation invoking the memory sub-system is executed, a delay prior to which an operation invoking the memory sub-system is executed, or both.

19. The system of claim 15, wherein the controller is to perform operations comprising, in response to determining that traffic that corresponds to data traffic types that exhibit endurance characteristics that are below a predetermined endurance characteristic threshold, performing an operation to cause the memory device to appear to not be selected for use with the data traffic types that exhibit endurance characteristics that are below a predetermined endurance characteristic threshold.

* * * * *